(12) United States Patent
Hsu

(10) Patent No.: US 6,757,330 B1
(45) Date of Patent: Jun. 29, 2004

(54) EFFICIENT IMPLEMENTATION OF HALF-PIXEL MOTION PREDICTION

(75) Inventor: Wei-Lien Hsu, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 09/584,873

(22) Filed: Jun. 1, 2000

(51) Int. Cl.⁷ .............................. H04N 7/12; G06K 4/36
(52) U.S. Cl. ............................ 375/240.17; 375/240.27; 382/236; 348/416.1
(58) Field of Search ................... 375/240.17, 240.16, 375/240.27, 240.24; 348/396.1, 402.1, 413.1, 416.1, 420.1; 382/236, 251, 252

(56) References Cited

U.S. PATENT DOCUMENTS

| | | | |
|---|---|---|---|
| 5,453,799 A | 9/1995 | Yang et al. | 348/699 |
| 5,822,007 A * | 10/1998 | Knee et al. | 348/416.1 |
| 5,963,259 A * | 10/1999 | Nakaya et al. | 375/240.17 |
| 6,005,980 A | 12/1999 | Eifrig et al. | 382/236 |
| 6,011,870 A | 1/2000 | Jeng et al. | 382/236 |
| 6,026,195 A | 2/2000 | Eifrig et al. | 382/236 |
| 6,026,217 A | 2/2000 | Adiletta | 395/200.77 |
| 6,037,985 A | 3/2000 | Wong | 348/405 |
| 6,047,088 A | 4/2000 | van Beek et al. | 382/243 |
| 6,067,322 A | 5/2000 | Wang | 375/240 |
| 6,071,004 A | 6/2000 | Le Gall et al. | 364/514 R |
| 6,072,830 A | 6/2000 | Proctor et al. | 375/240 |
| 6,175,593 B1 * | 1/2001 | Kim et al. | 375/240.17 |
| 6,542,548 B2 * | 4/2003 | Nakaya et al. | 375/240.17 |
| 6,574,371 B2 * | 6/2003 | Nakaya | 382/236 |

OTHER PUBLICATIONS

Cheung Chok Kwan, Fast Motion Estimation Techniques for Video Compression, City University of Hong Kong, Jul. 1998, pp. i–vi and 1–99.

* cited by examiner

Primary Examiner—Gims Philippe

(57) ABSTRACT

An improved form of half pixel accuracy motion estimation/compensation using the MPEG recommended half pixel approach resides in method and system. In the inventive method, an interpolated reference image is created before coding so that it can be preloaded into a cache memory and used whenever needed, without having to create it each time. To avoid redundant processing during accessing of sub-sampled interpolated data, the interpolated image using half pixel method is partitioned into four areas. The four areas are defined based on where in a 2×2 square region the pixels fall.

19 Claims, 7 Drawing Sheets a   b

×   o   ×       × INTEGER PIXEL
A   B              POSITION o HALF PIXEL
                   POSITION o   o           A = a
C   D           B = (a + b + 1)/2
                C = (a + c + 1)/2
                D = (a + b + c + d + 2)/4

×       ×
c       d

HALF-PIXEL PREDICTION BY BILINEAR INTERPOLATION

FORMAT FOR STORING THE INTERPOLATED IMAGE

HALF-PEL ACCURATE
MOTION VECTOR ESTIMATION

EFFICIENT IMPLEMENTATION OF HALF-PIXEL MOTION PREDICTION

BACKGROUND OF THE INVENTION

Field of the Invention

This invention relates generally to MPEG motion estimation methods, and in particular to an efficient and improved half pixel accuracy motion estimation prior to motion compensation.

BACKGROUND OF THE INVENTION

With the advent of computer networks, the storage and transmission of multimedia content has become commonplace. In this environment, a number of compression techniques and standards have emerged to reconcile data-intensive media such as audio and video with the typically limited storage capacity of computers, and with the typically limited data rates for networks.

One such standard for digital audio/video compression has developed by the Moving Pictures Excerpt Group (MPEG) of the International Standards Organization. This standard was first promulgated as MPEG-1, and has undergone several revisions named MPEG-2 (broadcast as a standard for high-definition television, now canceled), and MPEG-4 (medium resolution videoconferencing with low frame rates in a sixty-four-kilobit-per-second channel). These standards are collectively referred to herein as MPEG.

MPEG employs single-frame compression based upon a two-dimensional discrete cosine transformation ("DCT"), and quantization of the resulting coefficients. In this respect, it resembles the Joint Photographic Excerpts Group ("JPEG") still image compression standard. The MPEG standard provides further compression based upon temporal redundancy.

The MPEG standard is complex, particularly in view of the Constrained Parameter Bitstream (CPB) profile, which defines the MPEG standard to ensure compatibility among particular implementations. However, since MPEG achieves high compression ratios, it is widely used. Even with the CPB profile, MPEG provides a significant amount of design flexibility. While the flexibility of MPEG has led attention to be focused on methods for achieving greater compression ratios in the video stream, and on ensuring that the video can be decoded at an adequate frame rate, there remains significant room for improvement at the encoding end of MPEG systems.

The known basic scheme is to predict motion from frame to frame in the temporal direction and in the spatial directions. The DCT's (Discrete Cosine Transforms) organize any redundancy in the spatial directions. The DCT's may be done on 8×8 blocks, and the motion prediction is done in the luminance (Y) channel on 16×16 blocks. In other words, given the 16×16 block in the current frame that is intended to be coded, the object is to look for a close match to that block in a previous or future frame (there are backward prediction modes where later frames are sent first to allow interpolating between frames). The DCT coefficients (of either the actual data or the difference between this block and the close match) are quantized, which means that they are divided by some value to drop bits off the lower end. Hopefully, many of the coefficients will end up being zero. The quantization can change for every macroblock (a macroblock is 16×16 of Y and the corresponding 8×8's in both U and V). The result of all this, which includes the DCT coefficients, the motion vectors and the quantization parameters is Huffman coded preferably using fixed tables. The DCT coefficients have a special Huffman table that is two-dimensional in that one code specifies a run-length of zeros and the other specifies a non-zero value that ended the run.

As known in the art, there are three types of coded frames. There are I or intra frames. They are simply a frame coded as a still image, not using any past history. Then there are P or predicted frames. They are predicted from the most recently reconstructed I or P frame. Each macroblock in a P frame can either come with a vector and difference DCT coefficients for a close match in the last I or P, or it can just be intra coded (like in the I frames or P frames) if there was no good match.

Lastly, there are B (bi-directional) frames. They are predicted from the closest two I or P frame, one in the past and one in the future. It is desirable to search for matching blocks in those frames, and try different comparisons, e.g., the forward vector, the backward vector, and try averaging the two blocks from the future and past frames, and subtracting that from the block being coded. If none of those will work, the block may be intra coded.

Use of Half Pixel Method in MPEG Video Encoder

In video information processing, even though motion prediction accuracy historically has been governed by integer pel (or pixel) accuracy, more recently, motion prediction accuracy has been considerably improved by half pel motion estimation. It is known that video standards such as MPEG ½ and H 261/263 endorse the act of specifying motion vectors to half pixel accuracy.

An overview of the advantages of performing estimation using the half pixel method in the H 203/261 video compression standards can be found in"A Fast Software-only H 263 Video Coder: by Wei-Lien Hsu, published by Digital Equipment Corporation, Nashua, NH 03062 which is incorporated herein by reference.

It is to be noted that in H.263 although an interpolated image based in a reconstructed reference is created and used it requires a subsampling process, to read the interpolated pixels. For assembly code implementations, subsampling an unaligned reference image is considerably expensive because it requires extra steps to load more data and to skip pixels. In video coding algorithms, generally, reference images are unaligned. Furthermore the reference image has to be created by enlarging the half pixel image four times, which involves an expensive calculation. The enlarged reference image may have to be aligned for comparison purposes with a current frame which needs to be estimated.

There is generally a need for a more efficient and economical method of motion estimation, preferably by an improved half pixel method.

SUMMARY OF THE INVENTION

The present invention consists in obtaining an improved form of half pixel accuracy in motion estimation with certain attendant advantages. Half pixel search is done in the present invention by a method of averaging, as explained in more detail herein after.

Traditional implementations of half pixel motion estimation/compensation are known to offer some advantages but still are associated with set backs. Known half pixel motion estimation methods have disadvantages in that:

1. they require extra steps to down sample an interpolated reference image; or 2. it is necessary to perform pixel interpolation repeatedly during each calculation of the sum of absolute distortion (SAD).

In conventional MPEG video compression, bilinear interpolation is performed whenever the interpolated pixel is required. In other words, in conventional MPEG video compression, there is redundancy and lack of efficiency at least in the following three areas:

(i.) Motion estimation: In the motion estimation phase, in as much as the interpolated blocks are highly overlapped, the interpolation on each pixel must be repeatedly done.

(ii.) Reconstruction: Since the reference images are interpolated (using the half pixel approach) during the motion estimation phase, it will be necessary to redo the interpolation for the video reconstruction phase.

(iii.) In as much as the interpolated reference images are NOT stored in conventional MPEG video compression, there is no prior basis available for B frame calculations. B frames in the same group are bi-directional predicted, based on the same reference frames (I-P or P-P frames). For B frame calculations it is necessary to redo the interpolation, which can be avoided if the interpolated images are stored and used for B frame calculations.

The present invention optimizes the speed of half pixel accuracy motion estimation/compensation in two aspects:

a. To reduce memory traffic, an interpolated reference image is created before coding, so that it can be preloaded into a cache and can be used whenever needed without having to newly create it; and b. To avoid redundant processing during the access of the subsampling of interpolated data, the interpolated image (using a half pixel method) is partitioned into four areas.

The four areas are defined based on where in a 2×2 square region, the pixels fall. The partitioned interpolated image is stored into four distinct predetermined areas as described in more detail herein after. Using the inventive method based in the above inventive methodology has shown that this implementation has improved the performance of MPEG-2 encoding by about 10%.

The invention in its broad form resides in a half pixel motion estimation and reconstruction method of the type wherein a block from a current video frame is compared with a selected interpolated reference video image, comprising the steps of: creating an interpolated reference image with half pixel accuracy from a reference video data frame before coding; partitioning the interpolated reference image into four areas and storing interpolated reference image pixels in four separate buffer memory areas; calculating four half-pixel values for the interpolated reference image by using bilinear interpolation methods based on pixel position; ensuring that the current video block and said best match have similar pixel positions; searching within the interpolated image to obtain a best interpolated match block for a current video block which is being estimated, by applying a vector to the current video block, recognizing that the vector has half pixel accuracy; completing motion estimation by calculating a block error as a result of said step of searching; and reconstructing estimated video data by assembling estimated video data without having to skip pixels.

The invention in another aspect resides in a motion estimation method for MPEG-2 encoding of the type which uses a half pixel block matching method, wherein a current data frame to be encoded is compared with a reference frame, comprising the steps of: creating an interpolated reference image before coding of incoming video information is done; dividing and partitioning the interpolated reference image into four areas constituting reference blocks wherein each area relates to one type of interpolated pixel; storing the partitioned reference image in a buffer in four distinct buffer regions; and to perform estimation, comparing an integer pixel block current frame from an incoming video information with a selected one of said four buffer regions, whereby a block error in the form of a sum of absolute distortion (SAD) is calculated for the motion estimation.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF AN ILLUSTRATIVE EMBODIMENT

Figure 1:
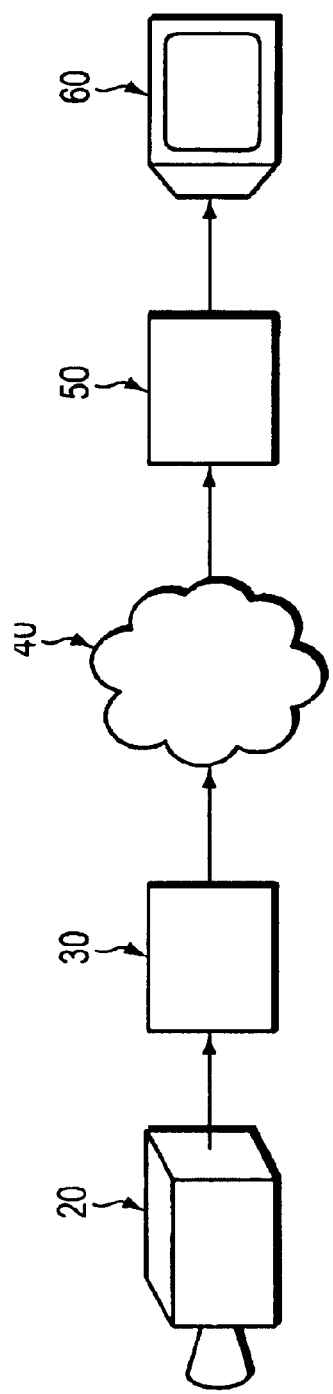
FIG. 1 is a typical multimedia encoder/decoder system in which the present invention can be used.

FIG. 1 shows a multimedia encoding/decoding system 10 in which the present invention can be implemented. The system 10 comprises a digital camera 20 that captures visual images in digitized frames and provides the frames in digital form to an encoder 30. The encoder 30 applies an encoding algorithm to compress the digitized frames for storage or transmission via a medium 40. A decoder 50 receives the encoded, digitized frames from the medium 40 and provides them in suitable form to a display 60.

It will be appreciated that the encoder 30 may include specialized encoding hardware such as a programmable gate array, an application specific integrated circuit, a microcontroller, a digital signal processor, or a combination of individual functional components, or the encoder 30 may be implemented in software using a general purpose computer device with a microprocessor and a memory. It will further be appreciated that the medium 40 may comprise any medium for storage and/or transmission of digital information that can receive digital information from the encoder 30 and transmit digital information to the decoder 50. This may include a computer network such as the Internet or any other private or public network, or a storage device such as a memory, a hard disk drive, or any other digital storage device known in the art.

The invention is described herein with reference to a preferred embodiment using the MPEG-2 standard. However, it will be clear to those skilled in the art that the invention may be usefully practiced with any video compression standard that encodes frames using differential or predictive techniques, and can accept motion estimation with half pixel accuracy, including MPEG-1, MPEG-4, and H.261 (a teleconferencing standard).

Figure 2:
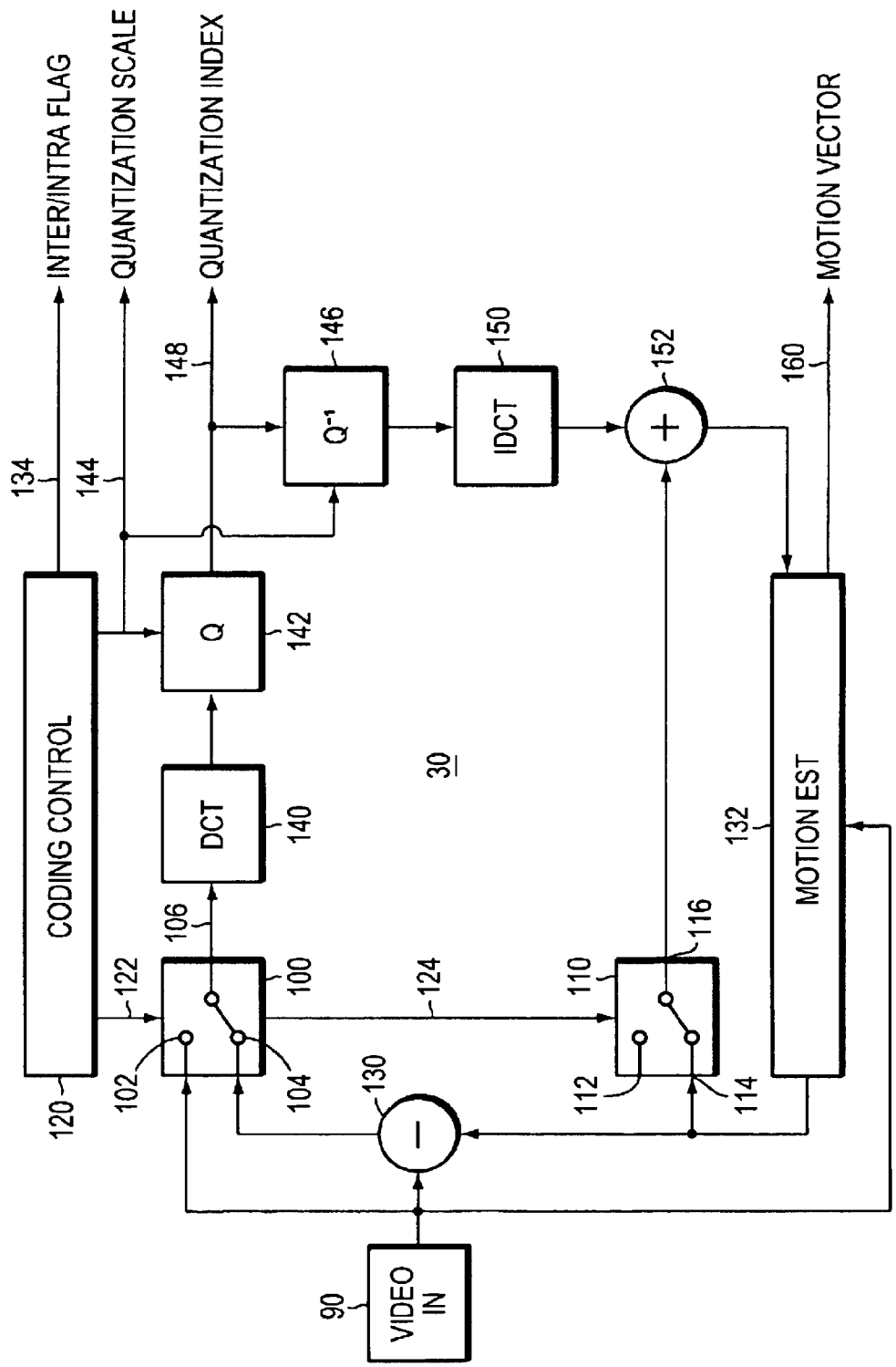
FIG. 2 illustrates a typical prior art MPEG encoder.

FIG. 2 shows a conventional MPEG encoder 30 that receives a video input 90 for MPEG encoding. The encoder 30 includes a first switch 100 having a first input 102, a second input 104, and an output 106. The encoder 30 also includes a second switch 110 having a first input 112, a second input 114, and an output 116. The switches receive control signals from a coding control unit 120 along a first control line 122 and a second control line 124. The control lines 122, 124 provide signals from the coding control unit 120 for each switch 110, 120 to select between its first and second inputs. These switches 100, 120 may be conceptual, and may not correspond to a physical switch in a particular software implementation of the encoder 30.

The video input 90 is provided to the first input 102 of the first switch, to a difference 130, and to a motion estimation unit 132. When the encoder 30 is encoding an intra-coded image, i.e., the full contents of a block from the video input 90, the coding control unit 120 provides a signal over the first control line 122 to the first switch 100 indicating that it should be connected the first input 102, which provides a direct connection to the video input 90. The coding control unit 120 provides a signal over the second control line 124 to the second switch 110 indicating that it should be connected to the first input 112, which is left open. The coding control unit 120 also sets an inter/intra flag 134 to indicate that the encoded block represents an intra-coded image.

The video input 90 is fed through the first input 102 of the first switch 100 to the output 106, where it is provided to the discrete-cosine transform (DCT) unit 140. The DCT unit 140 performs a two-dimensional DCT on the video input 90 and provides the transformed input to a quantization unit 142. The quantization unit 142 divides each value in the transformed input by a quantization step, with the quantization step for each coefficient of the transformed input being selected from a quantization scale. The coding control unit 120 stores the quantization scale. Since MPEG does not specify a particular quantization scale, the quantization scale is provided along a quantization scale signal line 144 to the quantization unit 142, to a de-quantization unit 146, and to subsequent processing as required for reconstruction of an encoded image. The transformed, quantized input is provided as a quantization index along a quantization index signal line 148 for further processing. Prior to storage or transmission, the quantization index is further compressed using re-mapping, run-length coding, and Huffman coding, all of which may be as specified by the MPEG standard.

In order to perform differential, inter-frame coding, as distinguished from the intra-frame coding described above, the quantization index is further provided to the de-quantization unit 146. The de-quantization unit 146 de-quantizes the quantization index and provides the resulting de-quantized coefficients to an inverse DCT unit 150. The inverse DCT unit 150 performs an inverse DCT transformation of the de-quantized coefficients to provide a reconstructed image to a summing unit 152. The summing unit 152 adds the output of the inverse DCT unit 150 to the output 116 of the second switch 110. When intra-coding a video input 90, the second switch 110 has no input, so the summing unit 152 simply provides the output of the inverse DCT unit 150 to the motion estimation unit 132.

Figure 3:
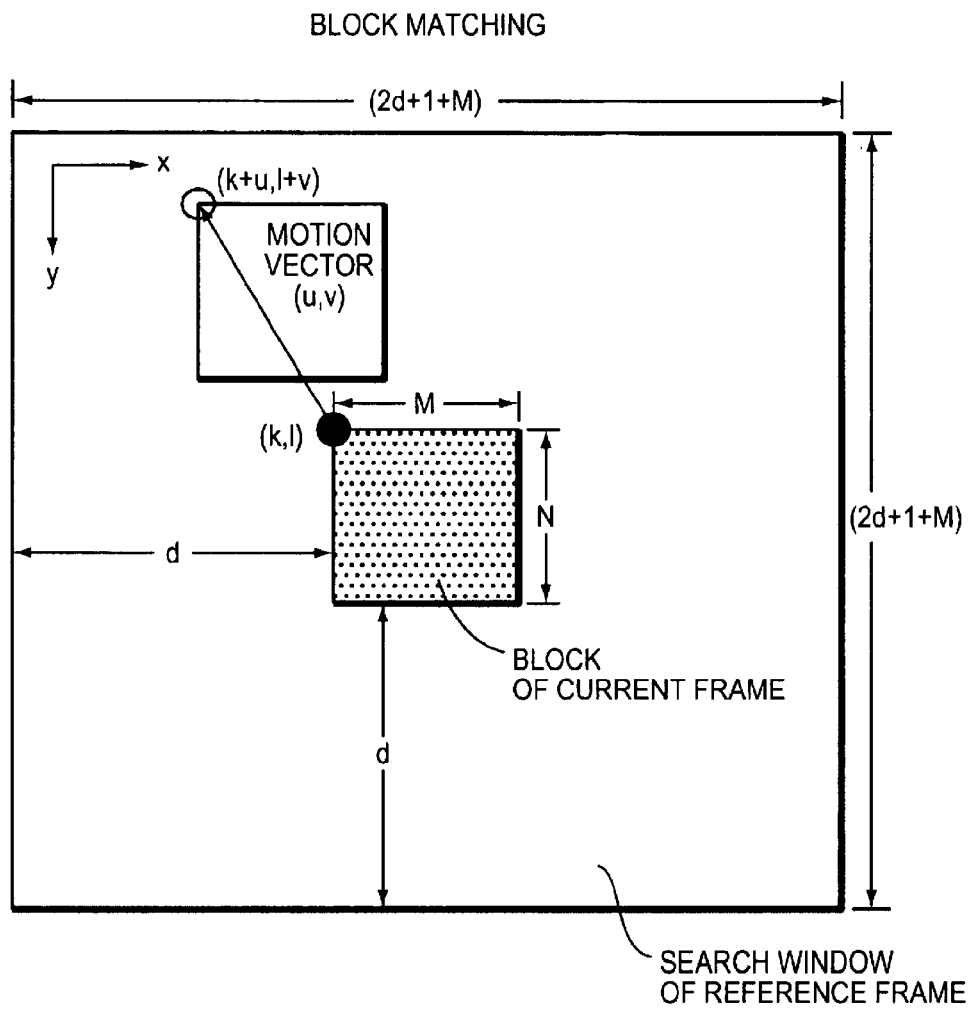
FIG. 3 illustrates typical block matching for motion estimation, wherein the present invention can be used.

FIG. 3 is a schematic representation of block matching methods for estimation in general. More particularly, FIG. 3 depicts the basic principle of block matching, wherein the current frame is divided into small rectangular blocks. For each block of the current frame, a motion vector is obtained by finding the displaced coordinate of a match block within the search window of the reference frame.

Suppose the block size is M×N pixels and the maximum displacement of a motion vector is +/− d in both horizontal and vertical directions. A motion vector (u, v) is obtained by finding a match block within a search window of size (2d+1)×(2d+1) in the reference frame. The center of the search window is equal to the location of the searching block of the current frame.

Block matching algorithms generally may be any one of the following types: Three-step search, 2D-logarithmic search, Orthogonal search, Cross search, New three-step search.

Half Pixel Accuracy Motion Compensation/estimation:

Half pixel accuracy motion compensation/estimation has been successfully used in MPEG and H.263 video codecs for improving the coding quality. However, this improvement requires some additional coding complexity in order to obtain this quality benefit.

Figure 4:
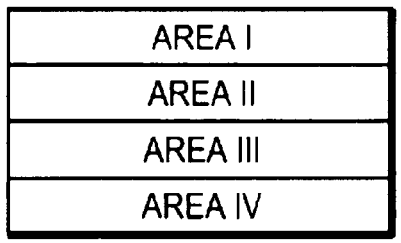
FIG. 4 illustrates half pixel prediction by bilinear interpolation and the storage of interpolated images in four areas.

Each half pixel value in the interpolated frame is found by using one of the four bilinear interpolation methods based ion its pixel position (as shown in FIG. 4).

In MPEG video compression, since bilinear interpolation is performed whenever the interpolated pixel is required, it causes very high redundancy in the following three areas:

(1) Motion Estimation: In the motion estimation phase, the interpolated blocks are highly overlapped, the interpolation on each pixel must be repeatedly done.

(2) Reconstruction: Since the reference images are interpolated during the motion estimation phase, it is not necessary to redo the interpolation for video reconstruction phase.

(3) B-Frame: Since all B-Frames in the same group are bi-directional predicted based on the same reference frames (I-P or P-P frames), the interpolation of both referencing images can be totally avoided if the interpolated images are stored and used for the B-frame calculation.

In H.263, although the interpolated image based on the reconstructed reference frame is created and reused, it requires a sub-sampling process to read the interpolated pixels. For assembly code implementation, sub-sampling an unaligned reference image is considerably expensive because it requires extra steps to load more data and to skip pixels especially because in all video coding algorithms, all reference images are unaligned.

Half pixel motion estimation includes steps to:

1. Use Block Method to perform integer-pixel accuracy search on reference frame (or called previous frame).

2. Refine the search for half-pixel accuracy.

The procedure of using a Block (usually 16×16 pixels) from the current frame and matching to the reference, and calculating the block error (or called SAD, sum of absolute distortion) can be expressed as:

$$SAD(x, y) = \sum_{i=0, j=0}^{15,15} |c(i, j) - r(i + x, j + y)|.$$

where c represents pixels inside the block-A of the current image, and r represents pixels inside block-A' on the reference image.

3. Then move the block around A and calculate SAD for each position, and

4. Choose the best matching position as the one that has the lowest SAD.

Refining the Search for Half-pixel Accuracy

After the integer search is done, the half-pixel accuracy search is performed by matching the block from the current frame to the interpolated image of the previous frame. This is accomplished by moving the matching block a half pixel in a left-right or, top-down direction.

Figure 5A:
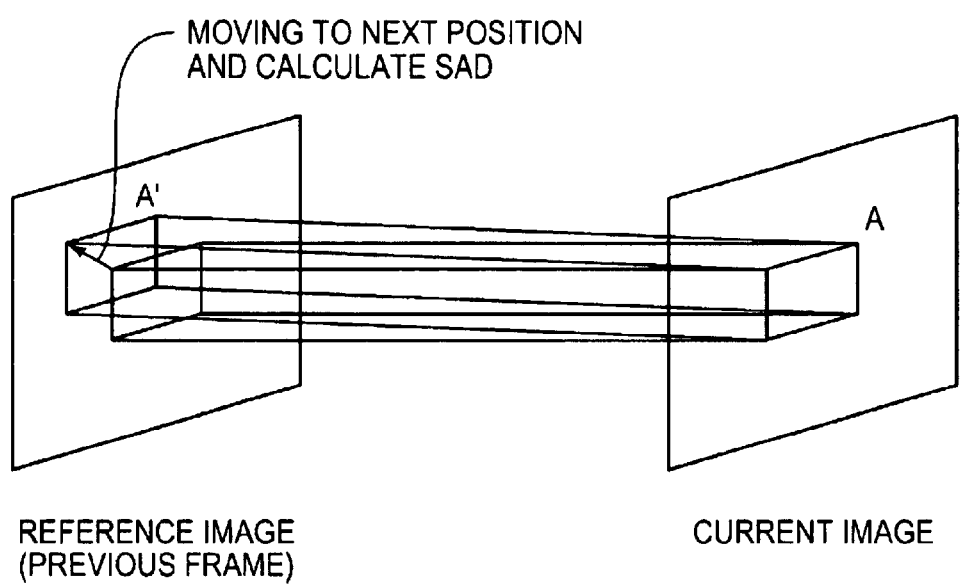
FIGS. 5a and 5b illustrate comparison of a current block with a reference image.
Figure 5B:
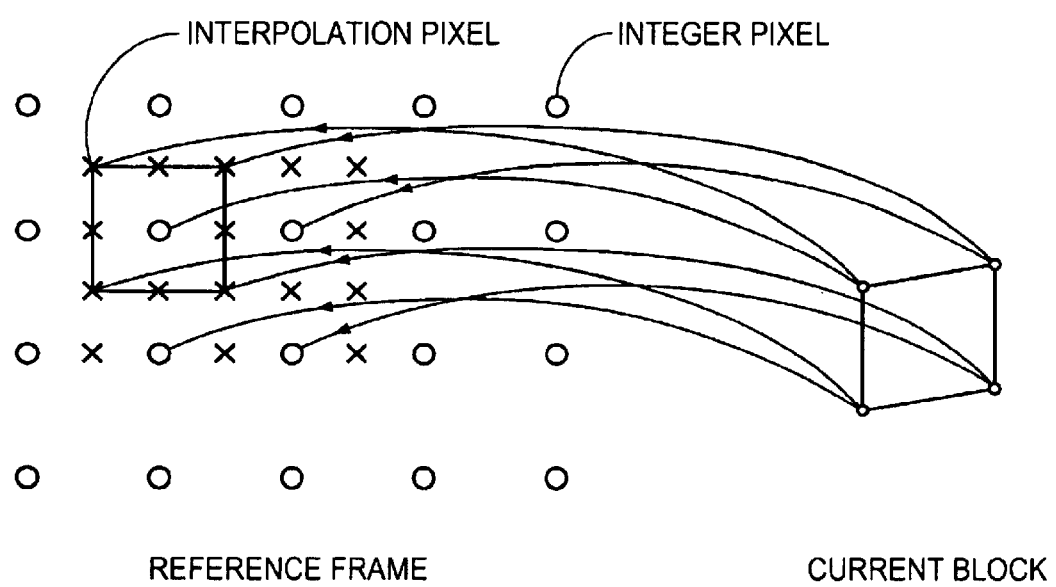
Figure 5C:
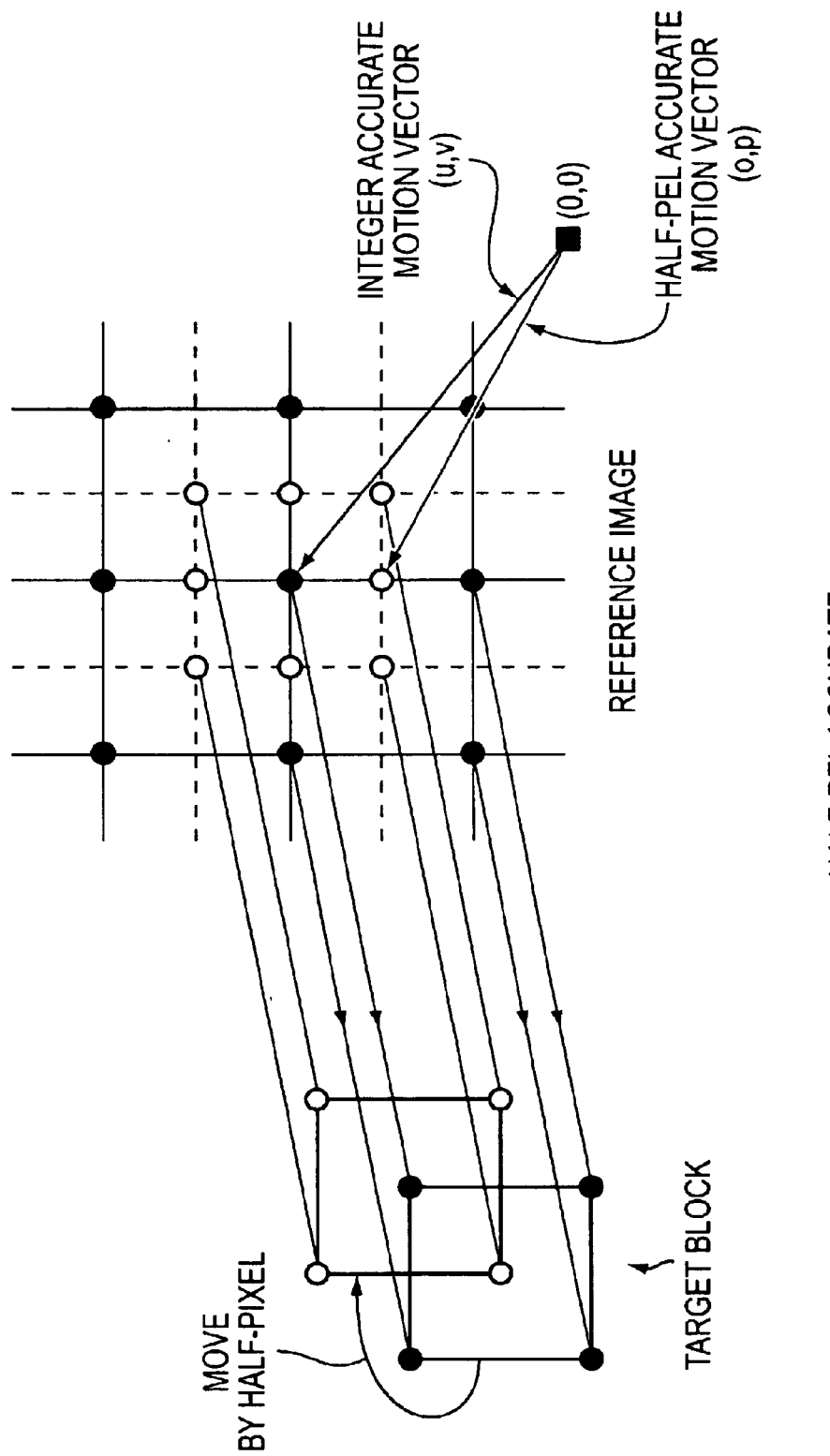

Interpolated pixels are generated by using the bilinear interpolation method (shown in FIG. 5C).

How the Present Invention Works:

Half-pixel motion estimation and reconstruction is used in the present invention to search a sub-sampled block, within the interpolated reference image, to find the best match to the current block. As it can be observed from the FIG. 4, all pixels inside a sub-sampled block are generated by the same interpolation method. Therefore, one way to allow reuse of the interpolated image and to avoid the cache-expensive redundant sub-sampling process and the associated computing is to store the interpolated image pixels in four separate areas in memory as illustrated in FIG. 4 and identified as Areas I, II, III, and IV.

The image buffer being divided into four areas (I to IV), area I stores the original integer image; image in Area II is generated by averaging of two left-right neighboring pixel-values (such as pixel-B shown in FIG. 4). Image in Area III is generated by the average of two top-down neighboring pixel-values (such as pixel-C in FIG. 4). Image in Area IV is generated by averaging of 4 neighboring pixel-values (such as pixel-D in FIG. 4).

Furthermore, identification of a pixel located at [Vx, Vy] position in the interpolated image can be found is based on the following rules.

a. If Vx and Vy are both even, the pixel is in Area I.
b. If Vx is odd and Vy is even, the pixel is in Area II.
c. If Vx is even and Vy is odd, then the pixel is in Area III.
d. If Vx and Vy are both odd, then the pixel is in Area IV. And the new pixel position is [Vx/2, Vy/2].

This arrangement allows a sequential access to the sub-sampled interpolated data block. Hence, it is extremely suitable for assembly-code implementation avoiding additional loads, storage and masking of pixel values. In terms of implementation, the half-pixel macro-block absolute error calculation can be achieved by Alpha Assembly-code, which requires only 7 instructions to calculate the absolute error of two eight-byte data (5 instructions to load unaligned reference data, 1 instruction to load aligned current data, and one Alpha multimedia video instruction (MVI) to perform absolute error calculation). On the contrary, the block error calculation with sub-sampling requires nine extra instructions to perform the same eight-byte error calculation (five instructions to load next eight-byte of unaligned data and four instructions to sub-sample the data). Experimental results show that combining this improvement with the removal of the redundant interpolation, the proposed method increases MPEG-2 encoding performance by approximately 10%.

While a predefined embodiment has been described herein, variations will become apparent to those skilled in the art without departing from the principles of the invention. For example, the digital camera 20, encoder 30, decoder 50 may be replaced by functional equivalents. Even the internal structural details of the encoder 30 including switches and control lines therein may be replaced by functional equivalents. Likewise, the discrete-cosine transform unit DCT, quantization and dequantization units and the motion estimation unit per se may be replaced by functionally equivalent units. Structural elements and hardware required to perform the half pixel accuracy motion compensation/estimation may be chosen to generally satisfy MPEG requirements and will be intelligible to those who are skilled in the art. Various modifications of the elements used in the context of explaining the preferred embodiment may be used to implement the invention, without departing from the scope thereof which is defined in the appended claims.

What is claimed is:

1. A half pixel motion estimation and reconstruction method of the type wherein a block from a current video frame is compared with a selected interpolated reference video image, comprising:

creating an interpolated reference image with half pixel accuracy from a reference video data frame before coding;

calculating four half-pixel values for the interpolated reference image by using bilinear interpolation methods based on pixel position;

partitioning the calculated interpolated reference image pixels in four areas and storing the partitioned interpolated reference image pixels in four separate buffer memory areas;

searching within the interpolated reference image to obtain a best interpolated match block for a current video block which is being estimated, by applying a vector to the current video block;

ensuring that the current video block and said best match have similar pixel positions;

completing motion estimation by calculating a block error as a result of said step of searching; and reconstructing an estimated video data frame by assembling estimated video data without having to skip pixels.

2. A method as in claim 1, wherein the step of calculating four half pixel values comprises calculating A, B, C and D corresponding to integer pixel values a, b, c and d as follows:

A=integer pixel a, B=(a+b+1)/2, C=(a+c+1)/2 and D=(a+b+c+d+2)/4.

3. A motion estimation method for MPEG-2 encoding of the type which uses a half pixel block matching method, wherein a current data frame to be encoded is compared with a reference frame, comprising:

creating an interpolated reference image before coding of incoming video information is done;

partitioning the interpolated reference image into four areas constituting reference blocks wherein each area relates to one type of interpolated pixel;

storing the partitioned reference image in a buffer in four distinct buffer regions; and comparing an integer pixel block current frame from an incoming video information with a selected one of said four buffer regions, whereby a block error in the form of a sum of absolute distortion (SAD) is calculated for the motion estimation.

4. An improved method for performing half-pixel motion estimation for ISO-standard MPEG type video encoders, wherein a current frame is divided into blocks and compared with a reference image for purposes of motion estimation, comprising:

creating an interpolated reference image with half pixel accuracy from a reference frame and storing the interpolated reference image in a buffer after partitioning the interpolated reference image into four distinct buffer areas;

recognizing four types of interpolation pixels;

applying a vector to a chosen block from the current frame to move the chosen block to a position of a matching block having a best match with a chosen one of said four distinct buffer areas, said vector having half pixel accuracy, said chosen current frame block and said chosen one of four distinct buffer areas having similar type of interpolation pixels from said four types of interpolation pixels; and completing motion estimation by calculating a block error.

5. An improved method for performing half pixel motion estimation and coding for ISO standard MPEG type video encoders by calculating block error by comparison of a current video data frame with a reference frame, comprising:

creating an interpolated reference image with half pixel accuracy before coding of incoming video information;

identifying and defining four types of interpolation pixels A, B, C, and D corresponding to integer pixels a, b, c, and d, where A=integer pixel a, B=(a +b +1)/2, C=(a+c+1)/2 and D=(a+b+c+d+2)/4;

partitioning the interpolated reference image into four areas and storing the partitioned image in four image buffer areas;

applying a vector to a chosen block of a current video data frame to move the chosen block to a position which will provide a best match with an interpolated half pixel reference image in such a manner that said chosen block of the current video data frame and said interpolated half pixel reference image have similar type of interpolation pixels;

completing motion estimation by calculating a block error in the form of sum of absolute distortion (SAD); and assembling estimated video data without having to skip pixels.

6. A half-pixel motion estimation and reconstruction method, wherein a current block in a video frame is compared with blocks of data contained in an interpolated reference video image, the method comprising:

selecting a reference video image;

creating the interpolated reference video image from the selected reference video image by calculating different types of half-pixel values in the selected reference video image using bilinear interpolation methods;

storing each different type of calculated half-pixel value in the interpolated reference video image in a separate buffer memory area;

searching the half-pixel values stored in the separate buffer memory areas to locate a best interpolated match block for the current block; and reconstructing the video frame using the best interpolated match block located for the current block.

7. The method of claim 6, wherein the step of calculating different types of half-pixel values further comprises calculating at least four types of half-pixel values A, B, C and D corresponding to integer pixel values a, b, c and d in the selected reference video image, as follows:

A=integer pixel a, B=(a+b+1)/2, C=(a+c+1)/2 and D=(a+b+c+d+2)/4.

8. The method of claim 6, further comprising:

ensuring that the current block and the best interpolated match block have similar pixel positions.

9. The method of claim 6, further comprising:

generating a vector to the best interpolated match block for the current block, the generated vector having half-pixel accuracy.

10. The method of claim 6, wherein the best interpolated match block corresponds to a block of half-pixel values having the least block error with respect to the current block.

11. The method of claim 10, wherein the block error for each block of half-pixel values is calculated as a sum of absolute distortion (SAD) with respect to the current block.

12. A motion estimation method that operates with half-pixel accuracy, wherein a current data frame to be encoded is compared with a reference frame, the method comprising:

creating an interpolated reference image by calculating different types of interpolated pixel values in the reference frame;

storing each type of interpolated pixel value in the interpolated reference image in a separate buffer memory area;

comparing an integer pixel block in the current data frame with a block of interpolated pixel values stored in a selected buffer memory area, whereby a block error is calculated for the block of interpolated pixel values;

repeating the step of comparing the integer pixel block in the current data frame with different blocks of interpolated pixel values in the selected buffer memory area until a best interpolated match block having the lowest block error is identified in the selected buffer memory area; and reconstructing the current data frame using the best interpolated match block located for the integer pixel block.

13. The method of claim 12, wherein the step of calculating different types of interpolated pixel values further comprises calculating at least four types of half-pixel values A, B, C and D corresponding to integer pixel values a, b, c and d in the reference frame, as follows:

A=integer pixel a, B=(a+b+1)/2, C=(a+c+1)/2 and D=(a+b+c+d+2)/4.

14. A motion estimation apparatus that operates with half-pixel accuracy, wherein a current data frame to be encoded is compared with a reference frame, the apparatus comprising:

means for creating an interpolated reference image by calculating different types of interpolated pixel values in the reference frame;

means for storing each type of interpolated pixel value in the interpolated reference image in a separate buffer memory area;

means for comparing an integer pixel block in the current data frame with a block of interpolated pixel values stored in a selected buffer memory area, whereby a block error is calculated for the block of interpolated pixel values;

means for repeating the step of comparing the integer pixel block in the current data frame with different blocks of interpolated pixel values in the selected buffer memory area until a best interpolated match block having the lowest block error is identified in the selected buffer memory area; and means for reconstructing the current data frame using the best interpolated match block located for the integer pixel block.

15. The motion estimation apparatus of claim 14, wherein the means for creating an interpolated reference image further comprises means for calculating different types of interpolated pixel values by calculating at least four types of half-pixel values A, B, C and D corresponding to integer pixel values a, b, c and d in the reference frame, as follows:

A=integer pixel a, B=(a+b+1)/2, C=(a+c+1)/2 and D=(a+b+c+d+2)/4.

16. A motion estimation encoder that operates with half-pixel accuracy, wherein a current data frame to be encoded is compared with a reference frame, the encoder being configured to:

create an interpolated reference image by calculating different types of interpolated pixel values in the reference frame;

store each type of interpolated pixel value in the interpolated reference image in a separate buffer memory area;

compare an integer pixel block in the current data frame with a block of interpolated pixel values stored in a selected buffer memory area, whereby a block error is calculated for the block of interpolated pixel values;

repeat the step of comparing the integer pixel block in the current data frame with different blocks of interpolated pixel values in the selected buffer memory area until a best interpolated match block having the lowest block error is identified in the selected buffer memory area; and reconstruct the current data frame using the best interpolated match block located for the integer pixel block.

17. The motion estimation encoder of claim 16, wherein the step of calculating different types of interpolated pixel values further comprises calculating at least four types of half-pixel values A, B, C and D corresponding to integer pixel values a, b, c and d in the reference frame, as follows:

A=integer pixel a, B=(a+b+1)/2, C=(a+c+1)/2 and D=(a+b+c+d+2)/4.

18. A computer-readable media comprising instructions for execution in a processor for a motion estimation method that operates with half-pixel accuracy, wherein a current data frame to be encoded is compared with a reference frame, the method comprising:

creating an interpolated reference image by calculating different types of interpolated pixel values in the reference frame;

storing each type of interpolated pixel value in the interpolated reference image in a separate buffer memory area;

comparing an integer pixel block in the current data frame with a block of interpolated pixel values stored in a selected buffer memory area, whereby a block error is calculated for the block of interpolated pixel values;

repeating the step of comparing the integer pixel block in the current data frame with different blocks of interpolated pixel values in the selected buffer memory area until a best interpolated match block having the lowest block error is identified in the selected buffer memory area; and reconstructing the current data frame using the best interpolated match block located for the integer pixel block.

19. The computer-readable medium of claim 18, wherein the step of calculating different types of interpolated pixel values further comprises calculating at least four types of half-pixel values A, B, C and D corresponding to integer pixel values a, b, c and d in the reference frame, as follows:

A=integer pixel a, B=(a+b+1)/2, C=(a+c+1)/2 and D=(a+b+c+d+2)/4.

* * * * *